(12) United States Patent
Tsuchiya

(10) Patent No.: US 11,633,891 B2
(45) Date of Patent: Apr. 25, 2023

(54) INJECTION MOLDING SYSTEM

(71) Applicant: FANUC CORPORATION, Yamanashi (JP)

(72) Inventor: Nobuatsu Tsuchiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 16/896,860

(22) Filed: Jun. 9, 2020

(65) Prior Publication Data

US 2021/0008769 A1 Jan. 14, 2021

(30) Foreign Application Priority Data

Jul. 11, 2019 (JP) .............................. JP2019-129097

(51) Int. Cl.
*B29C 45/14* (2006.01)
*B29C 45/56* (2006.01)
*B29C 45/80* (2006.01)

(52) U.S. Cl.
CPC ...... *B29C 45/14065* (2013.01); *B29C 45/561* (2013.01); *B29C 45/80* (2013.01); *B29C 2945/76013* (2013.01); *B29C 2945/76568* (2013.01); *B29C 2945/76772* (2013.01); *B29C 2945/76795* (2013.01)

(58) Field of Classification Search
CPC . B29C 45/14065; B29C 45/561; B29C 45/80; B29C 2945/76013; B29C 2945/76568; B29C 2945/76772; B29C 2945/76795; B29C 45/842; B29C 2045/425; B29C 2045/4266; B29C 2045/4275; B29C 45/14008; B29C 2945/76387; B29C 2945/76464; B29C 2945/76866; B29C 2945/76899; B29C 45/14073
See application file for complete search history.

(56) References Cited

U.S. PATENT DOCUMENTS

2018/0104875 A1* 4/2018 Hoeglinger ............. B29C 45/42

FOREIGN PATENT DOCUMENTS

| JP | H03-159721 A | 7/1991 |
| JP | H10-016022 A | 1/1998 |
| JP | 2013-233707 A | 11/2013 |
| JP | 2018-176720 A | 11/2018 |

* cited by examiner

*Primary Examiner* — S. Behrooz Ghorishi
(74) *Attorney, Agent, or Firm* — Studebaker & Brackett PC

(57) ABSTRACT

An injection molding system according to an aspect of the present disclosure is for performing insert molding, and includes: an opening-closing mechanism configured to open and close a pair of molds; an injection device configured to inject a resin into a space that is formed between the pair of molds when the pair of molds has been closed; and a positioning mechanism having a holding member configured to hold an insert part, the positioning mechanism configured to position the insert part between the pair of molds, and to cause the holding member to continue holding the insert part between the pair of molds even after the opening-closing mechanism starts to operate to close the pair of molds.

9 Claims, 9 Drawing Sheets

INJECTION MOLDING SYSTEM

This application is based on and claims the benefit of priority from Japanese Patent Application No. 2019-129097, filed on 11 Jul. 2019, the content of which is incorporated herein by reference.

BACKGROUND OF THE INVENTION

Field of the Invention

The present invention relates to an injection molding system.

Related Art

Injection molding has been widely carried out, in which a molten resin is injected into a space formed between a pair of molds, and then, solidified by being cooled, thereby producing a resin molding. As an aspect of the injection molding, insert molding is also carried out. In the insert molding, a resin is injected into a mold having an insert part disposed therein so that a molding including the insert part and the resin integrated with each other is produced.

In order to carry out the above-described injection molding efficiently, an injection molding system is built which automatically performs opening and closing of molds, removal of a resin molding, positioning of an insert part, and the like. It has also been proposed to use a robot to perform removal of a resin molding and positioning of an insert part (e.g., see Patent Document 1).

Patent Document 1: Japanese Unexamined Patent Application, Publication No. 2013-233707

SUMMARY OF THE INVENTION

Generally, to perform insert molding, one of a pair of molds is provided with a holding structure for holding an insert part, the pair of molds are closed after the insert part has been set to be held by the one of the molds, and thereafter, a resin is injected. However, depending on the design of a molding to be produced, due to vibration or the like occurring when molds having an insert part held therein are being closed, the insert part may deviate from a predetermined position by, for example, being inclined or falling off from the holding structure. In particular, in a case where the center of gravity of the insert part is located away from the holding structure provided in the mold, for example, the insert part is likely to deviate from the predetermined position. For this reason, there has been a demand for an injection molding system that can prevent an insert part from deviating from a predetermined position when molds are being closed.

An injection molding system according to an aspect of the present disclosure is for performing insert molding, and includes: an opening-closing mechanism configured to open and close a pair of molds; an injection device configured to inject a resin into a space that is formed between the pair of molds when the pair of molds has been closed; and a positioning mechanism having a holding member configured to hold an insert part, the positioning mechanism configured to position the insert part between the pair of molds, and to cause the holding member to continue holding the insert part between the pair of molds even after the opening-closing mechanism starts to operate to close the pair of molds.

The injection molding system according to the aspect of the present disclosure can prevent the insert part from deviating from a predetermined position when the molds are being closed.

DETAILED DESCRIPTION OF THE INVENTION

Figure 1:
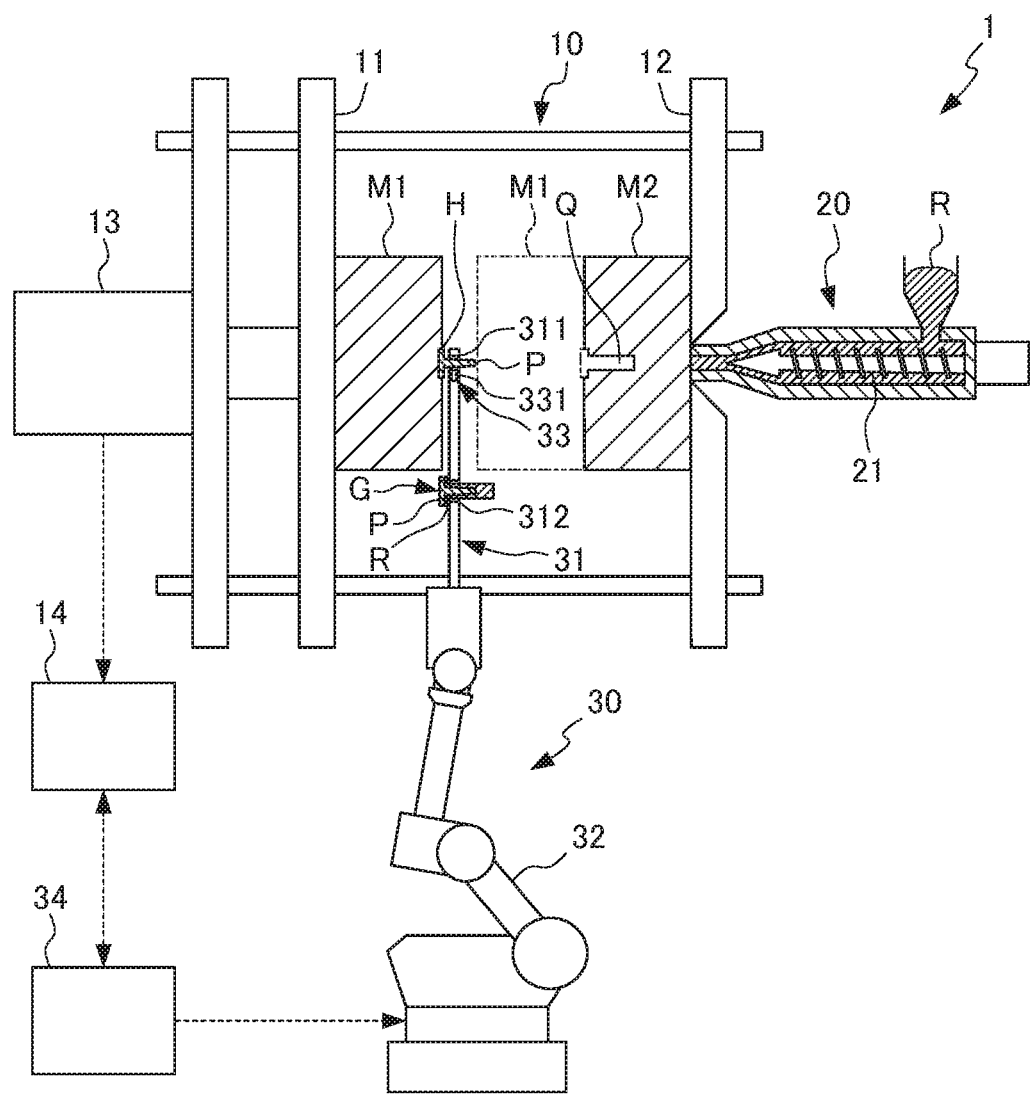
FIG. 1 is a schematic diagram showing a configuration of an injection molding system according to a first embodiment of the present disclosure.

Embodiments of the present disclosure will be described with reference to the drawings. In the following description, the same or similar components included in two or more embodiments described in order will be denoted by the same reference characters as those used in the embodiment described earlier, and description of such components will not be repeated.

First Embodiment

FIG. 1 shows an injection molding system 1 according to a first embodiment of the present disclosure. The injection molding system 1 includes: an opening-closing mechanism 10 for opening and closing a pair of molds (a movable mold M1 and a fixed mold M2); an injection device 20 for injecting a resin R into an inner space Q that is formed between the pair of molds M1 and M2 when the pair of molds have been closed; a positioning mechanism 30 for positioning an insert part P between the pair of molds M1 and M2. The injection molding system 1 is configured to produce an injection molding G including the insert part P and the resin R integrated with each other, by injecting the resin R in a molten state into the inner space Q which is formed between the pair of molds M1 and M2 and in which the insert part P is positioned, and by cooling and solidifying the resin R.

At least one of the molds M1 and M2 (usually the fixed mold M2) is provided with a flow path (e.g., a sprue or a runner) through which the resin R is injected from the injection device 20 into the inner space Q formed between the molds M1 and M2. Further, the movable mold M1 is provided with a part holder H for holding the insert part P fitted thereto.

A device commercially available as an injection molding device can be employed as the opening-closing mechanism 10 and the injection device 20. In other words, the injection molding system 1 may be built by way of addition of the positioning mechanism 30 to a conventional injection molding device.

The opening-closing mechanism 10 moves the movable mold M1 to open and close the pair of molds M1 and M2. The opening-closing mechanism 10 can have: a movable support 11 that can move while supporting the movable mold M1; a fixed support 12 that supports the fixed mold M2; a drive unit 13 that moves the movable support 11; and an opening-closing controller 14 that controls the drive unit 13.

When causing the drive unit 13 to close the molds M1 and M2, the opening-closing controller 14 outputs a signal indicating a location of the movable mold M1 to the positioning mechanism 30. This signal can be a signal representing the location of the movable mold M1 as coordinates of a reference point of the movable mold M1 in a case where a coordinate system of the opening-closing mechanism 10 is in coincidence with a coordinate system of the positioning mechanism 30. The signal may represent the location of the movable mold M1 as travel of the movable mold M1 from the open state of the pair of molds M1 and M2, the open sate being shown in FIG. 1.

Further, when the distance between the pair of molds M1 and M2 has decreased to a preset value, the opening-closing controller 14 outputs a signal requesting the positioning mechanism 30 to retract from between the pair of molds M1 and M2.

The injection device 20 melts the resin R provided in the form of pellets, and extrudes the molten resin R by pressurizing the resin R, thereby injecting the resin R into the inner space Q formed between the molds M1 and M2. The injection device 20 can be constituted by an extruder that pressurizes the resin R with at least one screw 21.

The positioning mechanism 30 has: a holding member 31 for holding the insert part P; a robot 32 an end of which is provided with the holding member 31; a mold detector 33 for detecting the location of the movable mold M1; and a positioning controller 34 for controlling the holding member 31 and the robot 32.

The positioning mechanism 30 positions the insert part P between the pair of molds M1 and M2. Specifically, the positioning mechanism 30 fits the insert part P to the part holder H. Further, the positioning mechanism 30 continues holding the insert part P between the pair of molds M1 and M2 even after the opening-closing mechanism 10 starts to operate to close the pair of molds M1 and M2, so that the insert part P remains fitted to the part holder H.

In accordance with a movement of the movable mold M1 implemented by the opening-closing mechanism 10, the positioning mechanism 30 moves the holding member 31 to maintain the holding member 31 at a constant relative location with respect to the movable mold M1. This feature makes it possible to move the movable mold M1, while causing the insert part P to remain fitted to the part holder H.

Before the opening-closing mechanism 10 completely closes the pair of molds M1, M2, the positioning mechanism 30 causes the holding member 31 to release the insert part P, and retracts the holding member 31 from between the pair of molds M1 and M2, while leaving the insert part P behind.

This retraction of the holding member 31 is preferably carried out at the latest possible timing at which the retraction does not interrupt the movement of the movable mold M1 implemented by the opening-closing mechanism 10 and at which the holding member 31 does not interfere with the molds M1 and M2. This feature can minimize the risk of falling of the insert part P from the part holder H, and the risk of incomplete fitting and abnormal inclination that can cause the insert part P to be caught between the molds M1 and M2, or can move the insert part P to an improper position in the space between the molds M1 and M2.

The holding member 31 may be any member as long as it can hold the insert part P, and is not particularly limited. For example, the holding member 31 may be configured to grip the insert part P or to suck the insert part P. The holding member 31 has a part holding portion 311 that holds the insert part P, and a molding holding portion 312 that holds the injection molding G. This configuration in which the holding member 31 has the part holding portion 311 and the molding holding portion 312 makes it possible to efficiently remove the produced injection molding G from between the molds M1 and M2, and to position a new insert part P for the next insert molding process between the molds M1 and M2, thereby shortening the cycle time of manufacture of the injection moldings G.

The part holding portion 311 and the molding holding portion 312 of the holding member 31 are preferably spaced apart from each other such that in a state where the insert part P held by the part holding portion 311 is positioned on the part holder H, the injection molding G held by the molding holding portion 312 can be positioned outside the molds M1 and M2. With this configuration, the timing at which the holding member 31 is retracted from between the molds M1 and M2 can be set to be further later, whereby the insert part P can be more reliably prevented from deviating from the predetermined position.

It is preferable for the holding member 31 that at least a portion thereof that becomes positioned between the molds M1 and M2 when the holding member 31 holds the insert part P on the part holder H has a smaller width than a length of the insert part P, the width and the length being in the direction of the movement of the movable mold M1. This feature enables the holding member 31 to be retracted from between the pair of molds M1 and M2 after the insert part P is set to be held by the pair of molds M1 and M2 so as not to deviate from the predetermined position.

The robot 32 may be, but is not limited to, an orthogonal coordinate robot, a SCARA robot, a parallel link robot, or the like. As shown in the drawings, a vertically articulated robot having excellent versatility can be employed as the robot 32. The robot 32 is controlled by the positioning controller 34. In order to prevent interference between the holding member 31 and the molds M1 and M2, the robot 32 inserts and retracts the holding member 31 in and from between the molds M1 and M2 preferably by moving the holding member 31 in a direction substantially perpendicular to the direction of the movement of the movable mold M1 implemented by the opening-closing mechanism 10.

The mold detector 33 may have an external force sensor 331 for detecting an external force acting on the part holding portion 311 of the holding member 31 in the direction of the movement of the movable mold M1. For example, a strain sensor may be used as the external force sensor 331. The mold detector 33 having the external force sensor 331 detects that the movable mold M1 is positioned to be in contact with the insert part P held by the holding member 31, and further, that the movable mold M1 is positioned to deform the insert part P and the holding member 31. In the present embodiment, the mold detector 33 is used to detect that an abnormal external force acts on the holding member 31.

Figure 2:
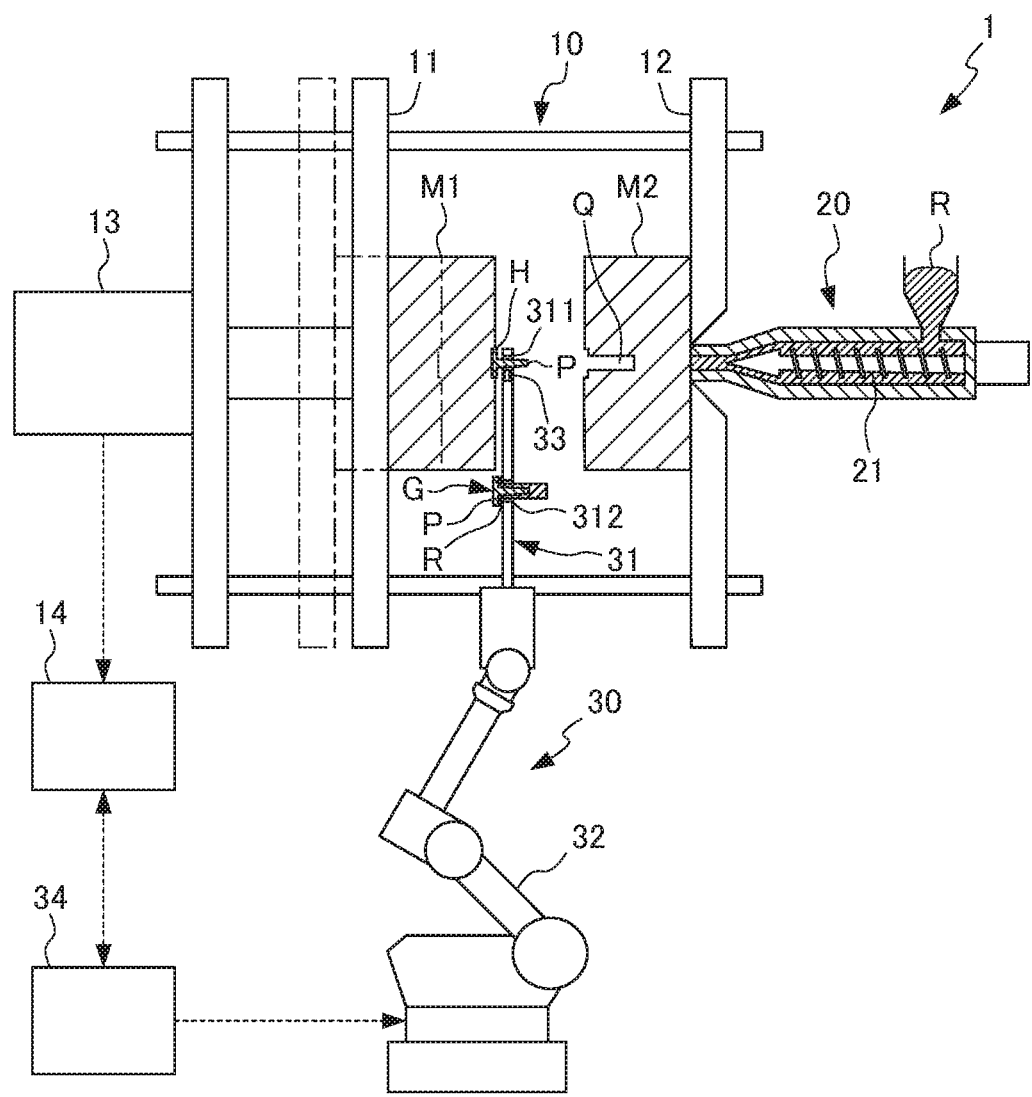
FIG. 2 is a schematic diagram showing the injection molding system of FIG. 1 in a state where molds are being closed.
Figure 3:
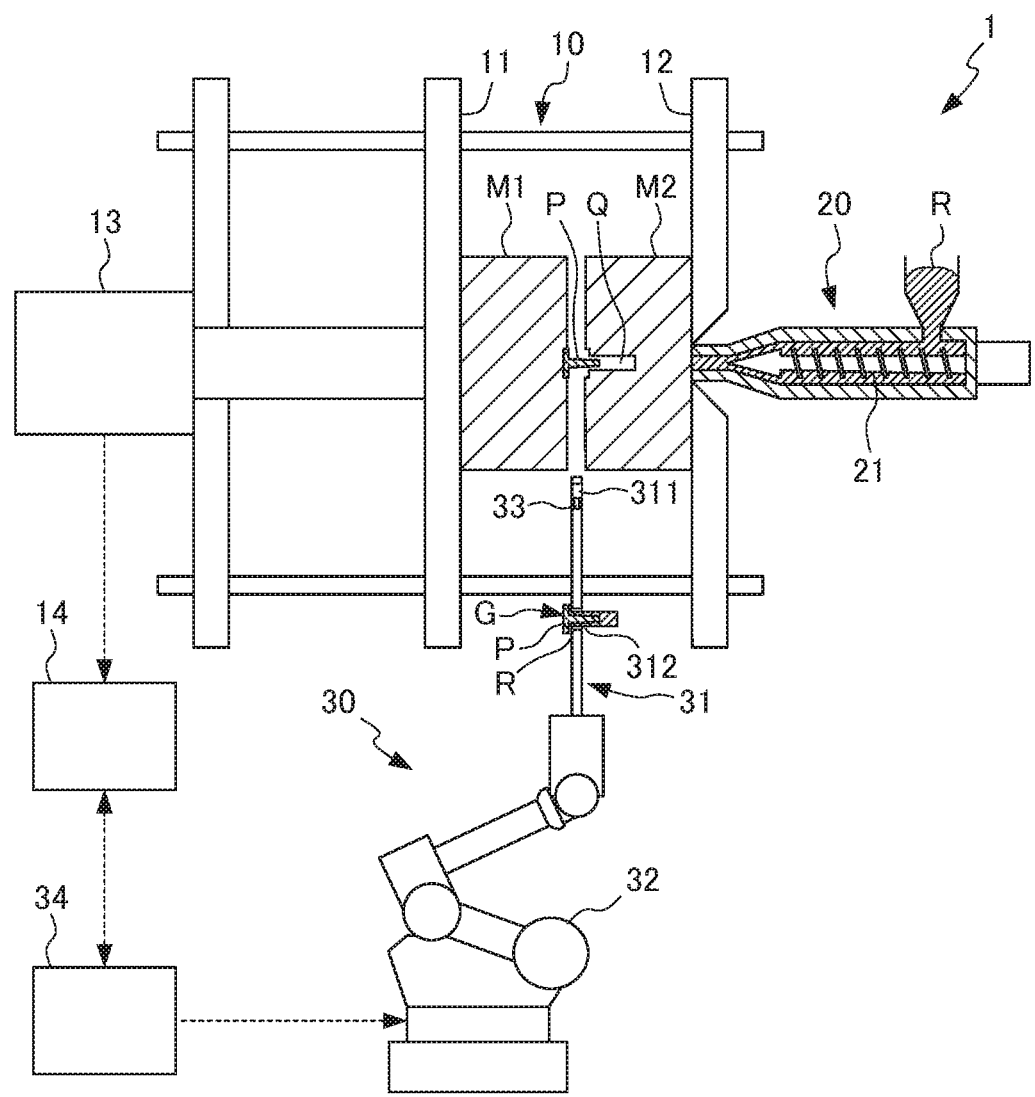
FIG. 3 is a schematic diagram showing the injection molding system of FIG. 1 in a state where a holding member has been retracted.

The positioning controller 34 can be implemented by a computer device having a CPU, a memory, etc., and executing an appropriate program. Before the opening-closing mechanism 10 closes the pair of molds M1 and M2, the positioning controller 34 positions the insert part P held by the holding member 31 on the part holder H of the movable mold M1, as shown in FIG. 1. Further, at least in an initial stage of the closing operation that the opening-closing mechanism 10 performs to close the pair of molds M1 and M2, the positioning controller 34 moves the holding member 31 in accordance with the movement of the movable mold M1 implemented by the opening-closing mechanism 10, as shown in FIG. 2. Furthermore, immediately before the gap in which the holding member 31 is positioned disappears from between the molds M1 and M2, the positioning controller 34 releases the insert part P from the holding member 31, and thereafter, retracts the holding member 31 from between the molds M1 and M2, as shown in FIG. 3. When the mold detector 33 detects an abnormal external force, the positioning controller 34 appropriately stops the operation of the injection molding system 1, depending on the magnitude of the external force.

In the present embodiment, the positioning controller 34 controls the motion of the robot 32 so that the travel of the holding member 31 becomes equal to the travel of the movable mold M1 inputted from the opening-closing controller 14 of the opening-closing mechanism 10.

Figure 4:
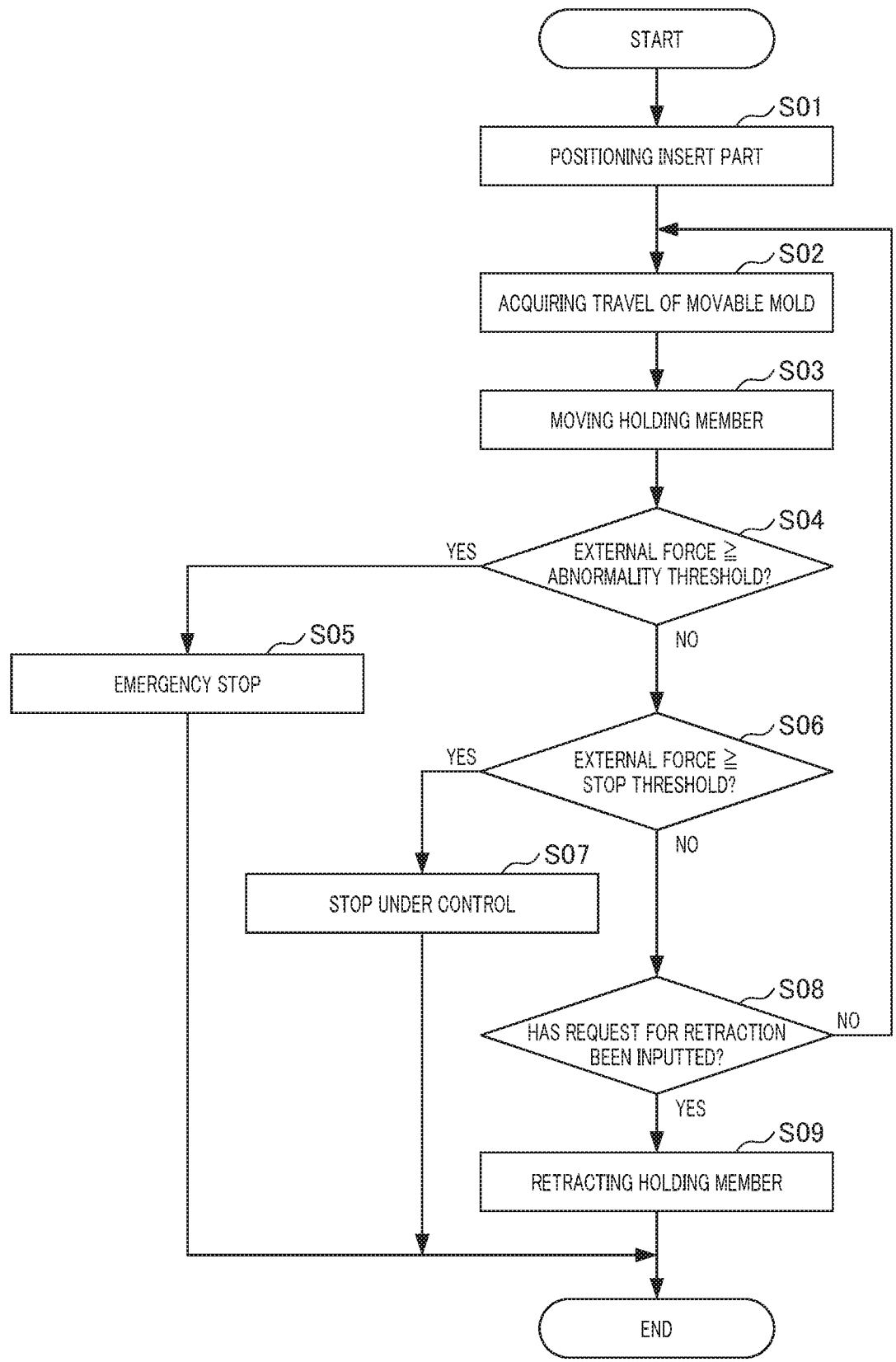
FIG. 4 is a flowchart showing a control process performed by a positioning mechanism of the injection molding system of FIG. 1.

FIG. 4 shows a control process which the positioning controller 34 of the positioning mechanism 30 of the present embodiment performs to control the holding member 31 and the robot 32. The control performed by the positioning mechanism 30 includes: a step of positioning the insert part P on the part holder H (Step S01; see FIG. 1); a step of acquiring travel of the movable mold M1 from the opening-closing controller 14 of the opening-closing mechanism 10 (Step S02); a step of causing the robot 32 to move the holding member 31 such that travel of the holding member 31 becomes equal to the travel of the movable mold M1 (Step S03; see FIG. 2); a step of determining whether a value (a magnitude of an external force) detected by the mold detector 33 is not less than an abnormality threshold (Step S04); a step of emergency stop of the injection molding system 1 while raising an alarm (Step S05) if the value detected by the mold detector 33 is not less than the abnormality threshold (YES in Step S04); a step of determining the value detected by the mold detector 33 is not less than a stop threshold that is smaller than the abnormality threshold (Step S06) if the value detected by the mold detector 33 is less than the abnormality threshold (NO in Step S04); a step of controllably stopping the injection molding system 1 (Step S07) in a situation where the value detected by the mold detector 33 is not less than the stop threshold (YES in Step S06), while alerting the situation; a step of determining whether the opening-closing controller 14 of the opening-closing mechanism 10 has inputted a signal requesting retraction of the holding member 31 (Step S08) in a situation where the value detected by the mold detector 33 is less than the stop threshold (NO in Step S06); and a step of releasing the insert part P and retracting the holding member 31 from between the molds M1 and M2 (Step S09; see FIG. 3) if the signal requesting the retraction of the holding member 31 has been inputted (YES in Step S08). If the signal requesting the retraction has not been inputted (NO in Step S08), the process returns to Step S02.

As can be seen from the foregoing, in the injection molding system 1, the holding member 31 continues holding the insert part P at a suitable position between the pair of molds M1 and M2 even after the opening-closing mechanism 10 has started to operate to close the pair of molds M1 and M2. Thus, the injection molding system 1 can prevent the insert part P from falling off from the part holder H or becoming incompletely fitted and inclined due to vibration or the like occurring when the opening-closing mechanism 10 is closing the molds M1 and M2.

Second Embodiment

Figure 5:
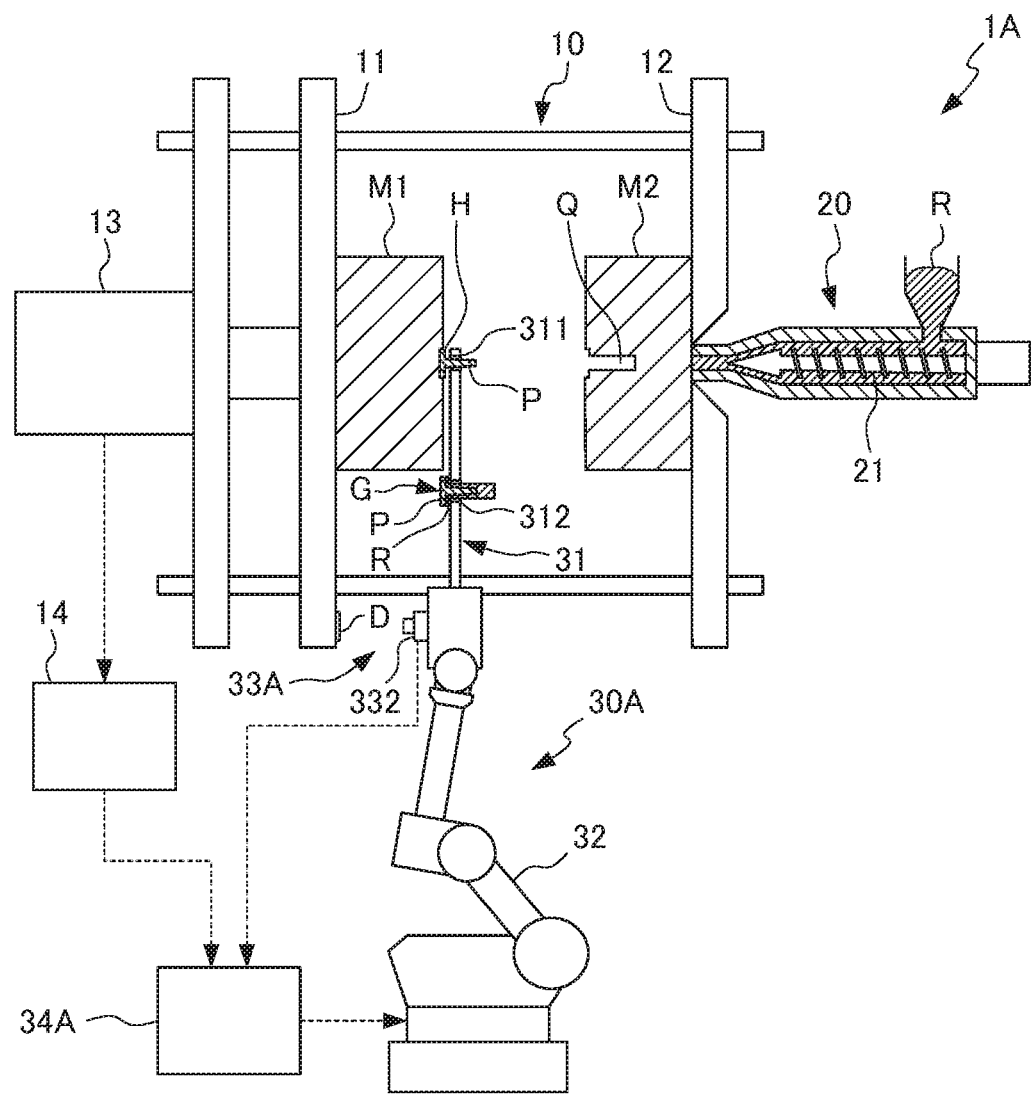
FIG. 5 is a schematic diagram showing a configuration of an injection molding system according to a second embodiment of the present disclosure.

FIG. 5 shows an injection molding system 1A according to a second embodiment of the present disclosure. The injection molding system 1A includes: an opening-closing mechanism 10 for opening and closing a pair of molds M1 and M2; an injection device 20 for injecting a resin R into an inner space Q that is formed between the pair of molds (the movable mold M1 and the fixed mold M2) when the pair of molds have been closed; and a positioning mechanism 30A for positioning an insert part P between the pair of molds M1 and M2.

The positioning mechanism 30A has a holding member 31 for holding the insert part P, and positions the insert part P between the pair of molds M1 and M2. Specifically, the positioning mechanism 30A fits the insert part P to a part holder H. Even after the opening-closing mechanism 10 starts to operate to close the pair of molds M1 and M2, the positioning mechanism 30A continues holding the insert part P between the pair of molds M1 and M2, and thereby causes the insert part P to remain fitted to the part holder H.

The positioning mechanism 30A has: the holding member 31; a robot 32 an end of which is provided with the holding member 31; a mold detector 33A for detecting a location of the movable mold M1; and a positioning controller 34A for controlling the holding member 31 and the robot 32.

The mold detector 33A of the present embodiment has an imaging device 332. In the present embodiment, the mold detector 33A causes the imaging device 332 arranged at the end of the robot 32 or at the holding member 31 to capture images of a marker D attached to the movable mold M1 or a portion of the opening-closing mechanism 10 which moves integrally with the movable mold M1. The mold detector 33A analyzes the images captured by the imaging device 332 using an image processing technique, and thereby calculates a location of the marker D with respect to the imaging device 332 as a reference, i.e., a relative value of the movable mold M1 with respect to the holding member 31.

For example, the mold detector 33A having the configuration described above may calculate a distance between the holding member 31 and the movable mold M1 based on the size of the marker D in the image captured by the imaging device 332. The positioning mechanism 30A causes the robot 32 to move the holding member 31 such that the size of the marker D in the images captured by the imaging device 332 remains unchanged. In this way, the positioning mechanism 30A can move the holding member 31 in accordance with the movement of the movable mold M1 implemented by the opening-closing mechanism 10. Further, in a case where the imaging direction of the imaging device 332 is not parallel to the direction of the movement of the movable mold M1, the mold detector 33A may calculate the relative value of the movable mold M1 with respect to the holding member 31, based on a coordinate position of the marker D in the captured image or based on the size and the coordinate position of the marker D in the captured image.

The positioning controller 34A positions the insert part P held by the holding member 31 on the part holder H of the movable mold M1 before the opening-closing mechanism 10 closes the pair of molds M1 and M2. At least in an initial stage of the closing operation that the opening-closing mechanism 10 performs to close the pair of molds M1 and M2, the positioning controller 34A moves the holding member 31 in accordance with the movement of the movable mold M1 implemented by the opening-closing mechanism 10, based on the value detected by the mold detector 33A. Further, immediately before the gap in which the holding member 31 is positioned disappears from between the molds M1 and M2, the positioning controller 34A releases the insert part P from the holding member 31, and thereafter, retracts the holding member 31 from between the molds M1 and M2.

In the present embodiment, the positioning controller 34A controls the motion of the robot 32 such that the relative location of the movable mold M1 with respect to the holding member 31 remains unchanged, the relative location being detected by the mold detector 33A.

Figure 6:
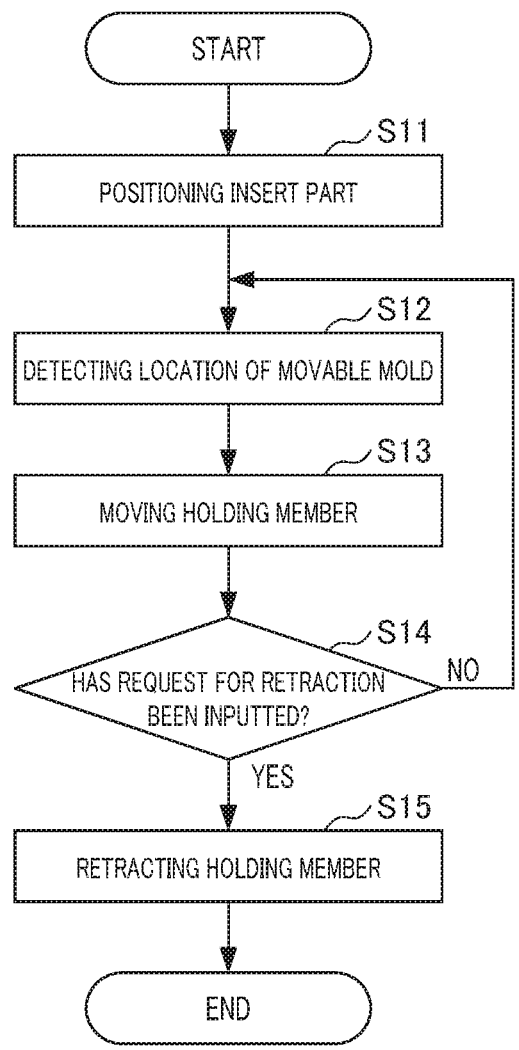
FIG. 6 is a flowchart showing a control process performed by a positioning mechanism of the injection molding system of FIG. 5.

FIG. 6 shows a control process which the positioning controller 34A of the positioning mechanism 30A of the present embodiment performs to control the holding member 31 and the robot 32. The control performed by the positioning mechanism 30A includes: a step of positioning the insert part P on the part holder H (Step S11); a step of detecting the location of the marker D by the mold detector 33A (Step S12); a step of moving the holding member 31 by the robot 32 such that a change in the relative location of the holding member 31 with respect to the movable mold M1 is inhibited (Step S13); a step of determining whether the opening-closing controller 14 of the opening-closing mechanism 10 has inputted a signal requesting retraction of the holding member 31 (Step S14); and a step of releasing the insert part P and retracting the holding member 31 from between the molds M1 and M2 (Step S15).

After Step S11 of positioning the insert part P on the part holder H, the positioning mechanism 30A causes the imaging device 332 to capture images of the marker D in Step S12, and specifies the size and the coordinates of the marker D in the captured images by image processing. In Step S13, the positioning mechanism 30A causes the robot 32 to move the holding member 31 such that a change in the size and coordinates of the marker D in the images captured by the imaging device 332 is inhibited. Thus, as the opening-closing mechanism 10 moves the movable mold M1, the holding member 31 is moved in accordance with the movable mold M1. Step S12 and Step S13 are repeated until the request for retraction of the holding member 31 is confirmed (YES) in Step S14. Upon confirmation of the request for retraction of the holding member 31 in Step S14, the insert part P is released and the holding member 31 is retracted in Step S15.

Third Embodiment

Figure 7:
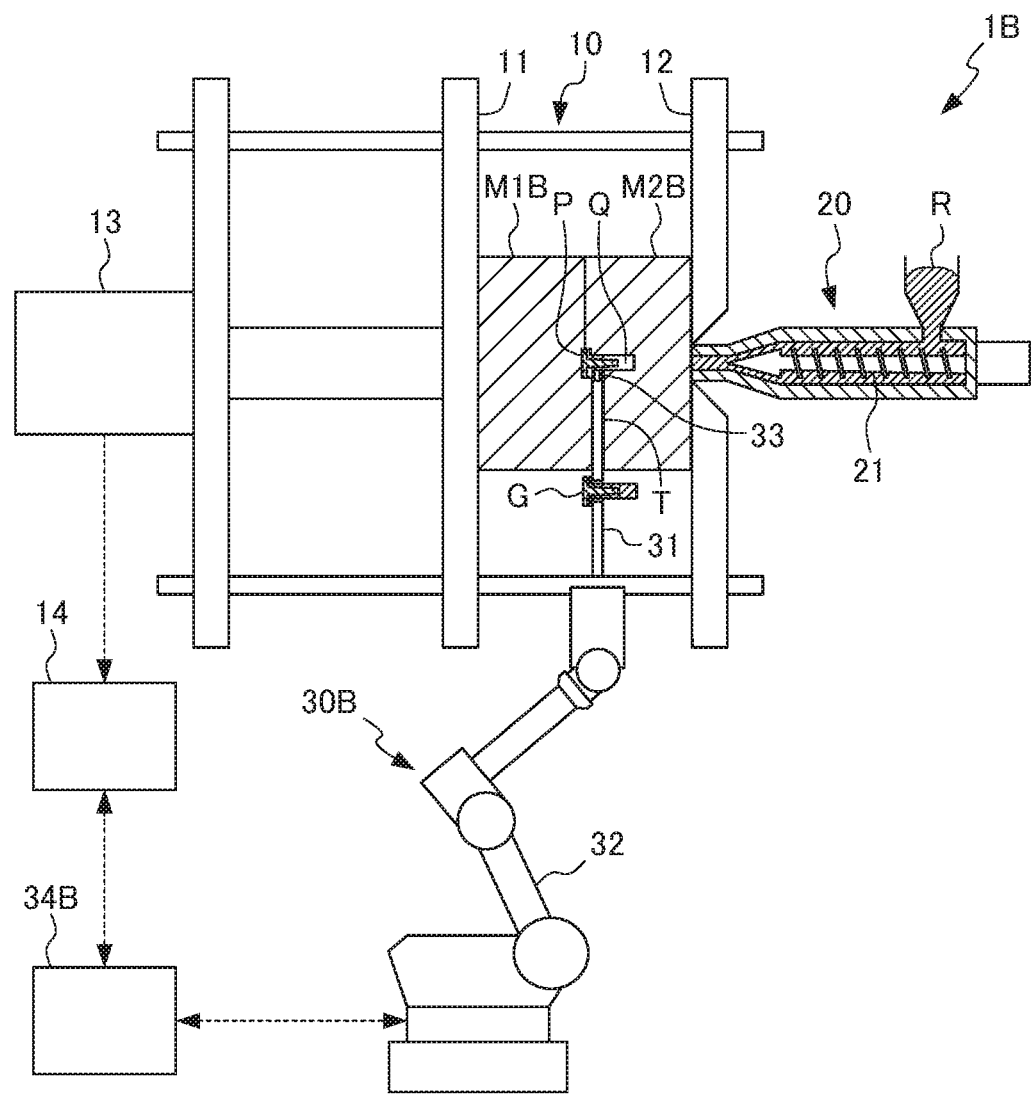
FIG. 7 is a schematic diagram showing a configuration of an injection molding system according to a third embodiment of the present disclosure.

FIG. 7 shows an injection molding system 1B according to a third embodiment of the present disclosure. The injection molding system 1B includes: an opening-closing mechanism 10 for opening and closing a pair of molds M1B and M2B; an injection device 20 for injecting a resin R into a space Q that is formed between the pair of molds M1B and M2B when the pair of molds have been closed; and a positioning mechanism 30B for positioning an insert part P between the pair of molds M1B and M2B.

The positioning mechanism 30B has: a holding member 31 for holding the insert part P; a robot 32 an end of which is provided with the holding member 31; a mold detector 33 for detecting a location of the movable mold M1; and a positioning controller 34B for controlling the holding member 31 and the robot 32. In the injection molding system 1B of the present embodiment, when closed, the molds M1B and M2B form an opening T in which the holding member 31 of the positioning mechanism 30B is positioned.

Before the opening-closing mechanism 10 closes the pair of molds M1B and M2B, the positioning controller 34B positions the insert part P held by the holding member 31 on a part holder H of the movable mold M1B, and moves the holding member 31 in accordance with movement of the movable mold M1B implemented by the opening-closing mechanism 10. The positioning controller 34B of the present embodiment retracts the holding member 31 from between the pair of molds M1B and M2B through the opening T after the opening-closing mechanism 10 has closed the pair of molds M1B and M2B.

In the present embodiment, the positioning controller 34B controls the motion of the robot 32 such that a contact pressure of the movable mold M1B detected by the mold detector 33 approaches a preset follow-up reference value, i.e., such that the movable mold M1B is maintained in contact with the insert part P at a suitable pressure.

Figure 8:
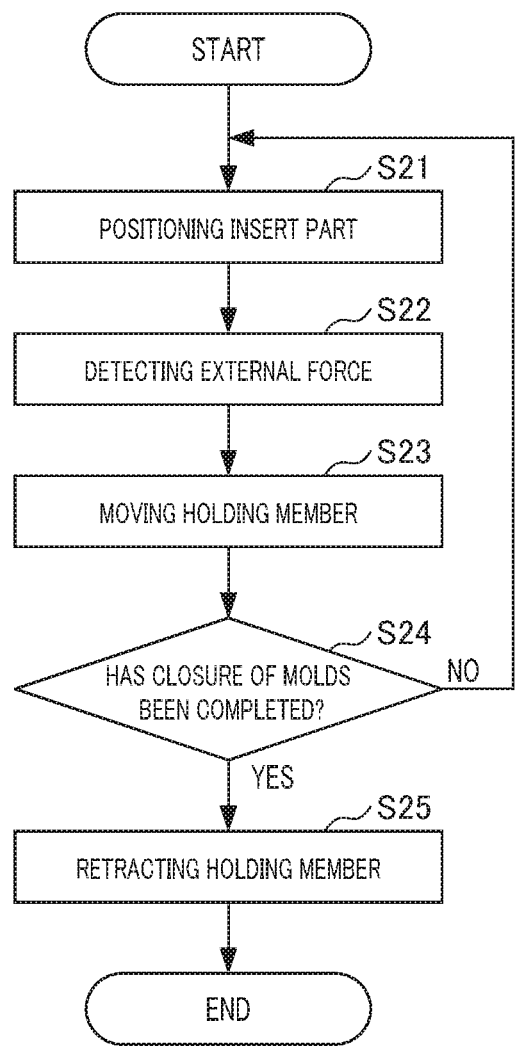
FIG. 8 is a flowchart showing a control process performed by a positioning mechanism of the injection molding system of FIG. 7.

FIG. 8 shows a control process which the positioning controller 34B of the positioning mechanism 30B of the present embodiment performs to control the holding member 31 and the robot 32. The control performed by the positioning mechanism 30B includes: a step of positioning the insert part P on the part holder H (Step S21); a step of determining a value detected by the mold detector 33 (Step S22); a step of moving the holding member 31 such that the value detected by the mold detector 33 approaches the follow-up reference value (Step S23); a step of determining whether the opening-closing controller 14 of the opening-closing mechanism 10 has inputted a signal requesting retraction of the holding member 31 (in the present embodiment, a signal informing the completion of closure of the molds M1B and M2B) (Step S24); and a step of releasing the insert part P and retracting the holding member 31 from between the molds M1B and M2B (Step S25). Steps S21, S22 and S23 are repeated until the completion of closure of the molds M1B and M2B is confirmed (YES) in Step S24. Upon confirmation of the completion of closure of the molds M1B and M2B in Step S24, the insert part P is released and the holding member 31 is retracted in Step S25.

In the injection molding system 1B, the holding member 31 continues holding the insert part P until the molds M1B and M2B are completely closed. This feature makes it possible to further reliably prevent the insert part P from deviating from the predetermined position. In the injection molding system 1B, the resin R may also enter the opening T. In this case, it is suitable to cut off such an excess of the resin R from the produced injection molding G, in the same manner as of a resin in a sprue, for example.

Fourth Embodiment

Figure 9:
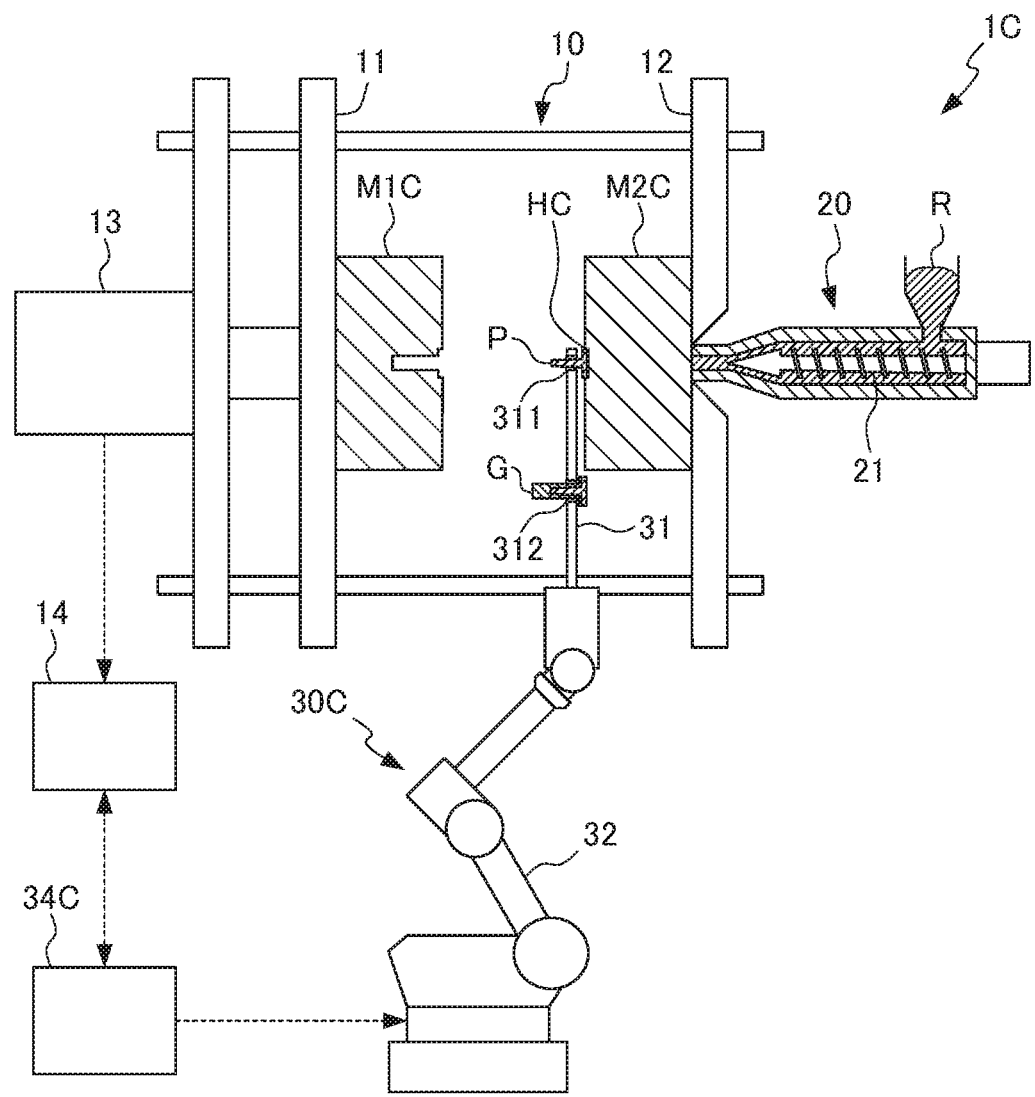
FIG. 9 is a schematic diagram showing a configuration of an injection molding system according to a fourth embodiment of the present disclosure.

FIG. 9 shows an injection molding system 1C according to a fourth embodiment of the present disclosure. The injection molding system 1C includes: an opening-closing mechanism 10 for opening and closing a pair of molds M1C and M2C; an injection device 20 for injecting a resin R into an inner space Q that is formed between the pair of molds M1C and M2C when the pair of molds have been closed; and a positioning mechanism 30C for positioning an insert part P between the pair of molds M1C and M2C. In the injection molding system 1C of the present embodiment, the fixed mold M2C is provided with a part holder HC for holding the insert part P fitted thereto.

The positioning mechanism 30C has: a holding member 31 for holding the insert part P; a robot 32 an end of which is provided with the holding member 31; and a positioning controller 34C for controlling the holding member 31 and the robot 32.

The positioning controller 34C first operates the robot 32 to position the holding member 31 such that the insert part P set in advance to be clamped is ready to be fitted to the part holder H. Thereafter, when a signal requesting retraction of the holding member 31 is inputted by the opening-closing mechanism 10, the positioning controller 34C operates the robot 32 so that the holding member 31 is caused to release the insert part P, and then, is retracted from between the pair of molds M1C and M2C, while the insert part P is left behind.

The embodiments of the injection molding system according to the present disclosure have been described in the foregoing. However, the injection molding system according to the present disclosure is not limited to the embodiments described above. Further, the effects described in the above embodiments are merely the most preferred effects exerted by the injection molding system according to the present disclosure. The effects of the injection molding system according to the present disclosure are not limited to those described above in the embodiments.

In the injection molding system according to the present disclosure, in a case where the opening-closing mechanism operates stably, an operation program according to which the positioning mechanism moves the holding member may be created based on an estimated speed at which the movable mold is moved by the opening-closing mechanism, so that the positioning mechanism starts to move the holding mechanism at the same time as when the opening-closing mechanism starts to close the molds.

In the injection molding system according to the present disclosure, the positioning mechanism may determine the timing when the holding member is to be retracted from between the molds, not in response to the signal from the opening-closing mechanism, but by detecting a location of the mold coming close to the holding member due to closure of the molds. Alternatively, the positioning mechanism may retract the holding member from between the molds upon elapse of a certain period of time from start of the mold closing operation of the opening-closing mechanism In the injection molding system according to the present disclosure, in a case where the pair of molds are configured to form an opening in which the holding member is positioned, after the resin has been injected into the inner space between the pair of molds, the holding member may be retracted from between the pair of molds through the opening. In this case, the resin can be prevented from flowing into the opening of the molds. For this purpose, the insert part may be provided with a holdable portion which projects from the insert part, is configured to be held by the holding member, and is to be cut off from the produced injection molding. Further, in the injection molding system according to the present disclosure, the holding member may be retraced from between the pair of molds through the opening after the injection device finishes injecting the resin, and before the resin is solidified.

In the injection molding system according to the present disclosure, the mold detector may be configured to cause an imaging device arranged on the opening-closing mechanism to capture images of a marker attached to the holding member or any other portion of the positioning mechanism. Alternatively, the marker may be omitted and the mold detector may detect the relative location of the mold with respect to the holding member by causing the imaging device to capture images of a geometrically characteristic portion of the opening-closing mechanism or the positioning mechanism.

EXPLANATION OF REFERENCE NUMERALS

1: Injection Molding System
10: Opening-Closing Mechanism
11: Movable Support
12: Fixed Support
13: Drive Unit
14: Opening-Closing Controller
20: Injection Device
21: Screw
30: Positioning Mechanism
31: Holding Member
311: Part Holding Portion
312: Molding Holding Portion
32: Robot
33: Mold Detector
331: External Force Sensor
332: Imaging Device
34: Positioning Controller
G: Injection Molding
M1, M1B: Movable Mold
M2, M2B: Fixed Mold
P: Insert Part
Q: Inner Space
R: Resin

What is claimed is:

1. An injection molding system for performing insert molding, the injection molding system comprising:
    an opening-closing mechanism configured to open and close a pair of molds;
    an injection device configured to inject a resin into a space that is formed between the pair of molds when the pair of molds has been closed;
    a part holder disposed in one of the pair of molds for holding an insert part fitted to the part holder between the pair of molds;
    a positioning mechanism having a holding member configured to hold the insert part, the positioning mechanism configured to fit the insert part to the part holder between the pair of molds; and
    a positioning controller configured to cause the positioning mechanism to position the insert part held by the holding member on the part holder, and to cause the positioning mechanism to move the holding member so that the holding member continues holding the insert part to the part holder even after the opening-closing mechanism starts to operate to close the pair of molds.

2. The injection molding system according to claim 1, wherein
    the opening-closing mechanism moves one of the pair of molds; and
    the positioning controller is configured to cause the positioning mechanism to move the holding member to maintain the holding member at a constant relative location with respect to the one of the pair of molds that is being moved by the opening-closing mechanism.

3. The injection molding system according to claim 1, wherein the positioning controller is configured to cause the positioning mechanism to release the insert part, and thereafter, retract the holding member from between the pair of molds before the opening-closing mechanism completely closes the pair of molds.

4. The injection molding system according to claim 1, wherein when closed, the pair of molds form an opening in which the holding member is positioned, and the positioning controller is configured to cause the positioning mechanism to retract the holding member from between the pair of molds through the opening after closure of the pair of molds.

5. The injection molding system according to claim 1, wherein the opening-closing mechanism moves one of the pair of molds; and the positioning mechanism has a mold detector configured to detect a location of the one of the pair of molds moved by the opening-closing mechanism.

6. The injection molding system according to claim 5, wherein the mold detector has an imaging device.

7. The injection molding system according to claim 5, wherein the mold detector has an external force sensor configured to detect an external force acting on the holding member.

8. The injection molding system according to claim 7, wherein the positioning controller is configured to cause the positioning mechanism to move the holding member such that a value detected by the external force sensor approaches a preset follow-up reference value.

9. The injection molding system according to claim 1, wherein the positioning mechanism comprises a vertically articulated robot an end of which is provided with the holding member.

* * * * *